Jan. 16, 1940.  J. PINK  2,187,094
APPARATUS FOR SPINNING AND WINDING GLASS FILAMENTS
Filed Oct. 6, 1937  4 Sheets-Sheet 4

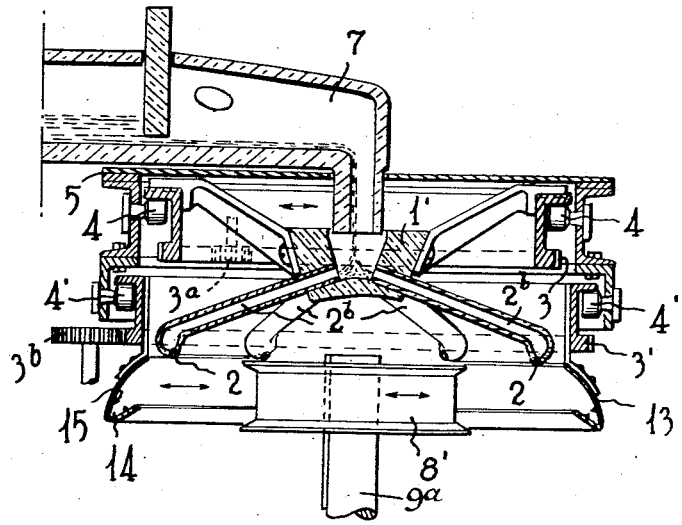
Fig. 3.
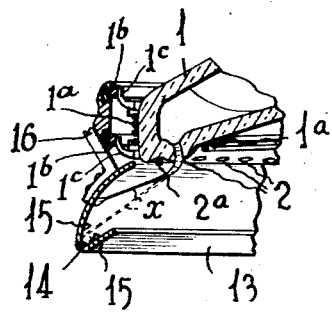
Fig. 1.a

Inventor
Johannes Pink
By Sommers & Young
Attorneys

Patented Jan. 16, 1940

2,187,094

UNITED STATES PATENT OFFICE 2,187,094

APPARATUS FOR SPINNING AND WINDING GLASS FILAMENTS

Johannes Pink, Weisswasser in Lausitz, Germany, assignor to Patent-Treuhand-Gesellschaft für Elektrische Gluhlampen m. b. H., Berlin, Germany Application October 6, 1937, Serial No. 167,645
In Germany October 16, 1936

14 Claims. (Cl. 49—1)

This invention relates to apparatus for producing spun filaments of glass or like material.

Numerous devices are already known for this purpose, and particularly for using slag glass. In the production of the glass filaments use has hitherto often been made of glass rods at the heated ends of which glass drops were first formed which were then caught up by a rotating drum and the glass filament drawn, and the filaments produced from the ends of the glass rods were wound on the drum. Such apparatus does not operate satisfactorily, as the new glass drops which are continually formed as a result of the unavoidable breaking off of the individual glass filaments are wound on the drum together with the filaments, so that the spun material is more or less permeated with injurious glass drops. Another disadvantage of the known apparatus consists in that the number of filaments which can be formed simultaneously is limited, as only a limited number of glass rods can be arranged for a single winding drum. Use has also been made of a stationary reservoir filled with fluid glass and provided with nozzles. In such apparatus glass drops are formed at the discharge ends of the nozzles and which, when they drop down, draw out glass filaments and are then wound continuously on a rotated drum. In such apparatus also, in which the winding itself is the same as in the previously mentioned method with heated glass rods, it is impossible to produce sufficiently perfect spun material and sufficient quantity thereof per unit of time. Finally, there are also machines with rotationally actuated glass receptacles provided on their lateral peripheries with nozzles from which the glass is projected laterally by centrifugal force. It is then necessary that the centrifugal drops and filaments be caught up in layer formation by a wall concentrically encompassing the receptacle. This apparatus has proven impracticable because, although through the centrifugal force the first centrifuged drops of each nozzle are projected on the collecting wall with sufficient certainty, the subsequently projected drops are too small in quantity to form the filaments. In these arrangements the filaments are not always applied on the encompassing wall, but contact the rotating receptacle, the result being in most cases that the nozzles of the receptacle are soon covered over with the wound filaments. Also, as soon as a filament is applied on the rotated receptacle instead of the collecting wall, the formation thereof is damaged, as the necessary pull on the filament is lacking.

The present invention relates to an apparatus for producing and simultaneously spinning glass filaments by the use of a plurality of spinning nozzles which, as is known per se, are also arranged in a circle, are fed with fluid glass, and are set in common revolution so that, as a result of centrifugal action, glass filaments are centrifuged outwardly from the nozzles from the drawn drops. According to the invention this apparatus has a collecting ring encompassing the nozzle crown concentrically and projecting downwardly therefrom, which ring takes up only the centrifuged glass drops but not the filaments. The apparatus is additionally provided with a vertically movable winding member disposed axially of the nozzles and the collecting ring, the winding member having a smaller diameter than the nozzle crown and, according to requirements, may be of filament, thread, rod, roller or drum form. As a result of the circulatory movement of the nozzles the glass filaments formed between the nozzles and the collected drops of the collecting ring are first applied tangentially on the centrally disposed winding member, and then continuously wound thereon. Since the drops which always freshly form on the breaking off of the filaments again pass to the drop collecting ring, instead of together with the filaments to the filament winding member, the final spun and wound product consists only of filaments. Inasmuch as with the new apparatus a very large number of circularly arranged nozzles can easily be co-ordinated with a single spinning member, it is easily possible to wind large quantities of glass filaments per unit of time. It is also possible by means of the new apparatus to apply the filaments formed in large quantities, under some circumstances, directly on the members, for example a cable, to be provided with the spun glass as an insulation, wherein the cable is used as a vertically movable collecting member.

Several exemplary embodiments of the invention are illustrated in the accompanying drawings.

In the drawings:

Fig. 1a is an enlarged detail;

Fig. 3 shows in vertical section a somewhat modified apparatus for spinning and winding onto a rotatable roller;

Figure 1:
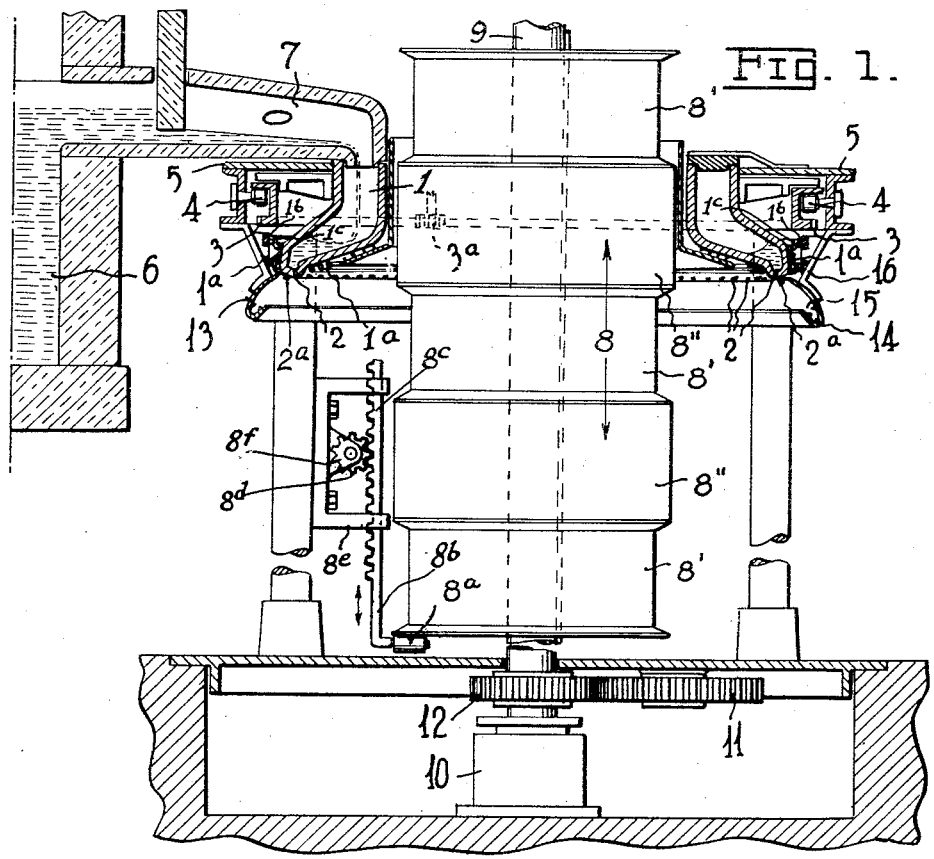
Fig. 1 is a vertical section through an apparatus for covering or winding a drum with spun glass.

The apparatus of Fig. 1 has an annular glass reservoir 1 of refractory material provided at the bottom with a large number of downwardly and inwardly directed nozzles 2 arranged in crown formation, that is, arranged in a circle and having axial direction of extent. The receptacle 1 carries a concentrically encompassing gear 3 and rests on a number of rollers 4 of the stationary base 5 of the apparatus. The gear 3 is set in rotation together with the glass reservoir connected therewith by means of a driving gear 3a shown in dotted lines. The annular glass receptacle 1 is supplied continuously or at regulable time intervals with glass from the reservoir 6 by means of a spout 7. Extending axially through the annular glass receptacle 1 is a drum 8, the axis or shaft 9 of which rests in a thrust bearing 10. The drum 8 may be set in rotation in either direction by means of the gears 11, 12. The drum is guided vertically slidably in its shaft and can be moved up and down by means of roller 8a and shaft 8b having rack portion 8c moved upwardly or downwardly by pinion 8d carried on a rotatable shaft mounted in bracket 8f, the upward and downward movement being symbolized by the oppositely directed arrows. The drum consists of several parts of different diameter, for example, three parts 8' of smaller diameter and two parts 8" of larger diameter. The different parts of the drum can be connected with and disconnected from the drive shaft 9 by means not shown. Provided below the rotatable glass receptacle 1, and encompassing the nozzles 2, is a conical, outwardly arched collecting ring 13 which, like the receptacle 1, encompasses the drum 8 concentrically. This ring 13 is curved inwardly at the lower end portion to form an annular trough 14 which is provided interiorly with small teeth 15 forming barbs, the purpose of which will be hereinafter explained. The collecting ring 13 is connected by means of rods 16 with the stationary frame 5 of the apparatus.

Figure 2:
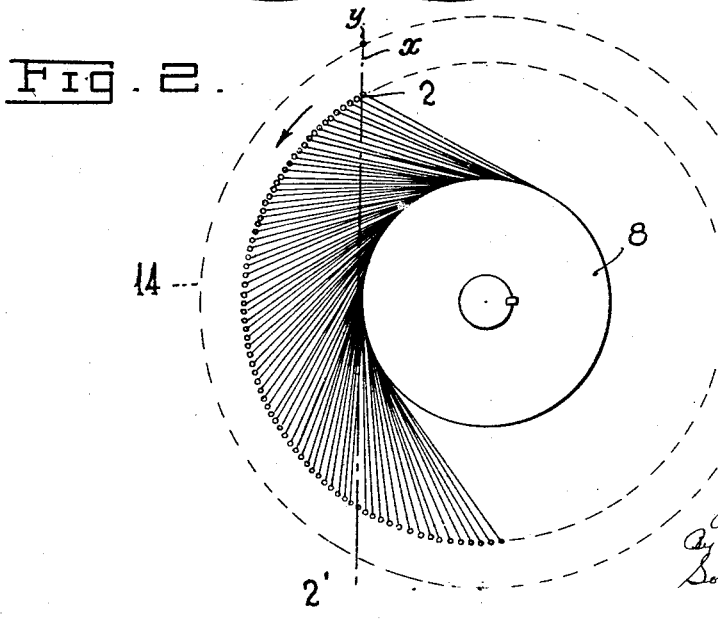
Fig. 2 is a diagrammatic top view of the spinning operation.

On setting the machine in operation the nozzles of the rotated glass receptacle 1 first begin to form drops of fluid glass. The drops formed are then projected outwardly by the resulting centrifugal force, whereby they draw a glass filament after them. The glass drops strike against the collecting ring 13 and slide downwardly therein, until retained by the small teeth 15 of trough 14. Between the retained drops and the nozzles of the further rotating glass receptacle there are formed glass filaments x (Figs. 1a and 2) which become longer in proportion as each nozzle 2 (Fig. 2) by its revolving movement moves away from the stationary collected drops y in the direction of the arrow, until the filaments are applied on the periphery of the drum at the moment in which the nozzles and the corresponding drops are exactly tangential to the periphery of the drum, that is, when the nozzle designated 2, of Fig. 2, passes into the position 2' and the initially short filament x is stretched between points y and 2'. From then on, further rotation of the glass receptacle winds the filaments directly and continuously on the drum. The glass filaments, being applied tangentially and simultaneously on the drum periphery, cannot interfere with each other as they are applied, not in a horizontal plane, but over a conical area or surface, due to the difference in height between the nozzles and the small teeth 15 of the collecting trough 14 extending downwardly from the nozzle crown. As soon as the winding of the filament is begun the initial portion of each filament extending between the drops and the drum periphery breaks off without coming in contact with the wound spun material, and can easily be removed by the operator. As the drum, during the rotation of the glass receptacle, continually moves upwardly and downwardly slowly, the glass filaments are wound in uniform layers on the drum 8. In the exemplary construction shown the central, smaller diameter section 8' of the drum is spun with several layers by repeated upward and downward movement of the entire drum, until this section has attained the thickness of the section 8" of larger diameter therebelow. This section 8" is then spun with a layer and the spinning of the lowermost section 8' begun. The nozzles of the glass receptacle are suitably provided with openings about 2–5 mm. diameter which is sufficient size to assure the formation of the discharging glass particles, so that clogging during operation can occur less easily than with very fine nozzles. The glass formations extending from the nozzles also permit the filaments to be elastically spun from the receptacle, whereby the breaking of the filaments during the spinning operation is effectively prevented. Also, through the projecting glass formations of the spinning nozzles the centrifuging of sufficiently large glass drops is promoted at the beginning of the spinning and thus greater certainty in collecting the glass drops on the collecting ring 13. In order to maintain the necessary and desired fluidity of the glass for the spinning, the glass receptacle and the nozzles or only the nozzles themselves are suitably heated, for example by means of electric heating coils 1a and/or 2a which receive electric current from contact slip rings 1b through contacts 1c.

The multi-part drum used as a winding member rotates, suitably in opposite direction from the receptacle 1, in order to accelerate the winding and to draw the filaments finer. However, the winding member can also rotate in the same direction as the receptacle, and possibly with greater velocity. Finally, it may be desired under some conditions to rotate only the receptacle, thus move the winding member only up or down, or up and down.

As shown on Fig. 1, the collecting ring 13 may be connected with the stationary frame 5 and thus be stationary. But, as shown on Fig. 3, it can also be rotatably journalled and for this purpose may have attached thereto a gear 3' which runs on rollers 4' of the frame ring 5 and is driven by gear 3b. Gear 3 is driven by gear 3a similarly as in Fig. 1. The ring 13 can be rotated opposite the rotational direction of nozzles 2 or also in the same direction as said nozzles, but at reduced speed.

Figure 4:
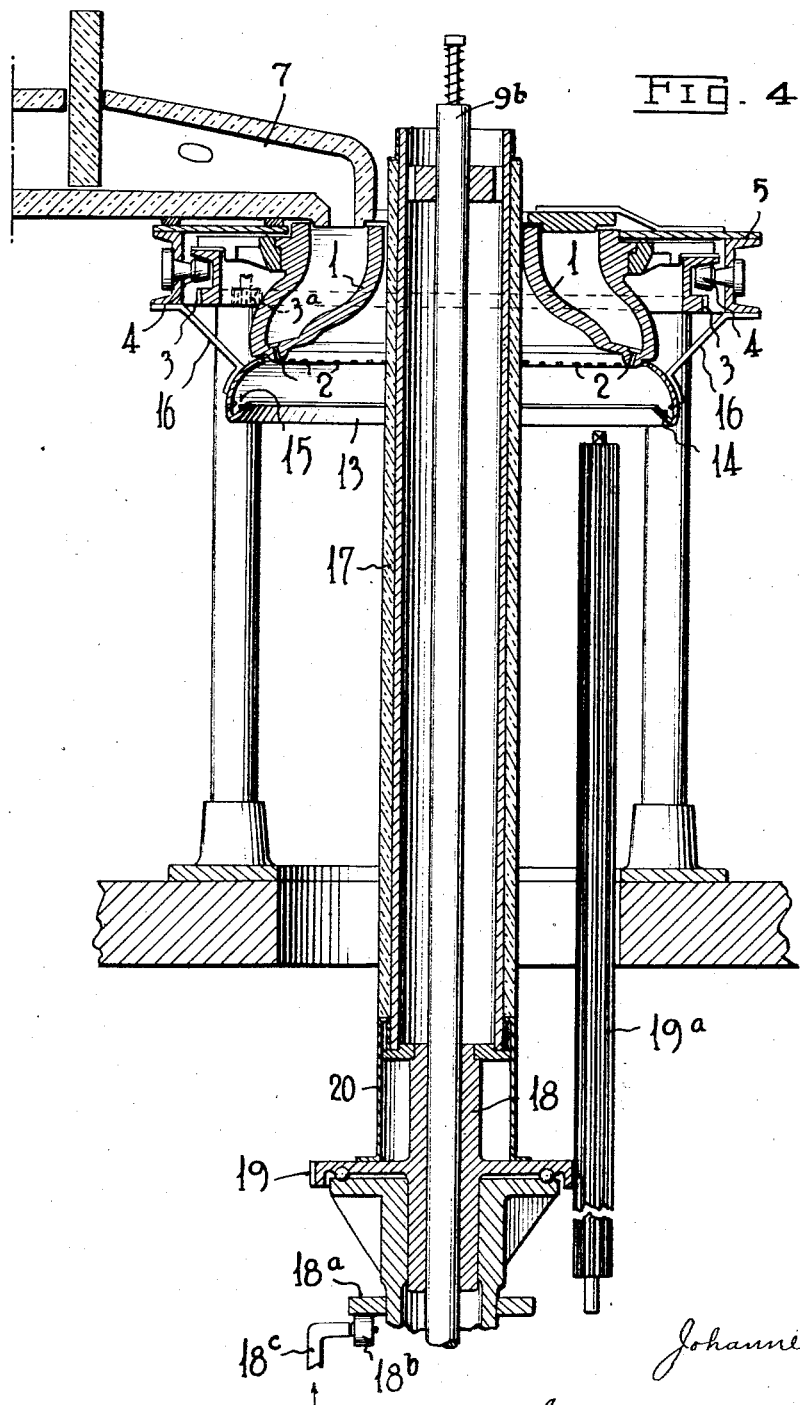
Fig. 4 is a vertical section through an apparatus for spinning or winding onto an interchangeable rotatable tube.

In the apparatus of Fig. 4 use is made of a tubular winding member 17 which is to be provided directly with spun insulation. The tube 17 rests on a vertically reciprocable and simultaneously rotatable mounting 18 which has a drive gear 19 driven by elongated gear 19a in any vertical position of adjustment of the mounting. The winding member 17 and its mounting member 18 are carried by shaft 9b. The mounting is moved upwardly and downwardly by flange 18a which rests on roller 18b mounted on vertically movable shaft 18c. The lower end of tube 17 is loosely encompassed by a small auxiliary drum 20 which is attached to the mounting 18. If the tube 17 is wound with the desired thickness of glass by being moved up and down, the auxiliary drum is carried into the range of the spinning nozzles and is also wound, thus without interruption of the spinning operation. During the time in which the auxiliary drum is receiving the filament the wound tube 17 can be removed and replaced by a new one, whereupon the position of the tube is moved downwardly and the fresh tube receives the glass filaments. The material wound on the auxiliary drum can be removed during the winding of the new tube 17. Since the tube 17 and drum 20 rotate at a slow rate, the accumulation of material on the drum can be cut loose manually during the continuance of the operation of the machine.

Figure 5:
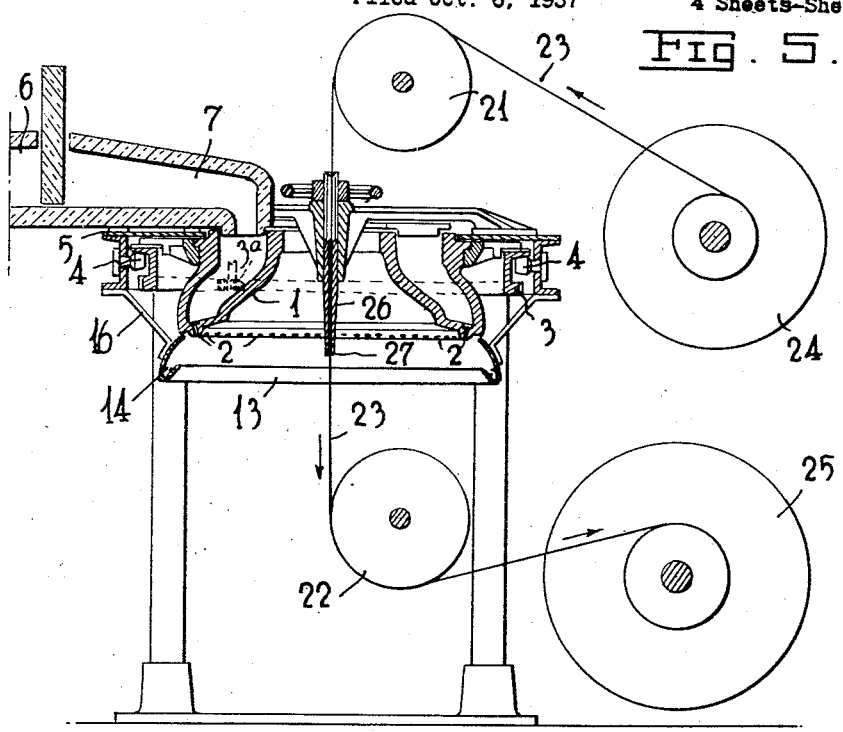
Fig. 5 is a vertical section through an apparatus for spinning or winding onto a continuously moved filament.

According to Fig. 5 the winding member consists of a continuously moved filament 23 guided over rollers 21, 22, which unwinds from a roller 24 and winds on a drum 25. In the vicinity of the nozzles 2 of the annular glass receptacle 1 the filament 23 runs through a sleeve 26 with a nozzle-like end part which serves for centering it, and is adjustable in size or removable and replaceable by other similar sleeves of different size.

Figure 6:
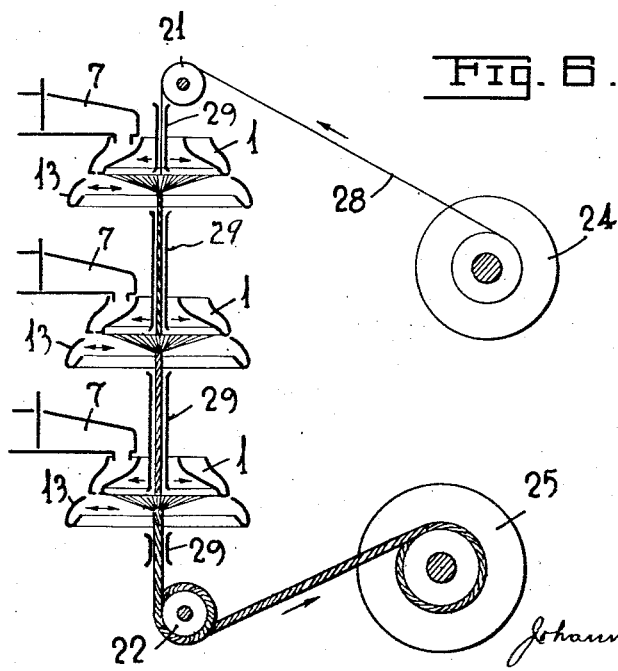
Fig. 6 is a diagrammatic vertical section through an apparatus having a plurality of superposed glass receptacles for spinning or winding onto a continuously moved cable.

According to the construction of Fig. 6 three spinning units are arranged in vertical superposition. Each unit may be similar to that shown in Fig. 1 or Fig. 5 and includes glass receptacles 1 having crowns of spinning nozzles 2 connected thereto. Coordinated with each receptacle is a conical collecting ring 13 which may be stationary as in Fig. 1, or else rotatable in either direction as in Fig. 3. The rotary motion of the receptacles and collecting rings is diagrammatically symbolized by double-headed arrows. Each glass receptacle may be provided with a glass feed trough 7. Extending through all three receptacles 1 is a cable 28 running off a roll 24 and guided over rollers 21, 22, the cable being provided during the passage with three superposed glass layers by the three nozzle crowns. In order that the cable 28 to be wound by the drum 25 shall retain the necessary centered position, it is moved through guide sleeves 29. The three glass receptacles 1 can be rotated in the same direction, but also it may be preferable to rotate them oppositely, in order to provide a solid structure of the spun glass insulation by oppositely winding the different glass layers.

The invention is not limited to the use of annular glass receptacles. It is also possible, as shown on Fig. 3, to pass fluid glass into a rotated nozzle head 1' with radially disposed nozzle arms 2b, which are bent so as to leave sufficient space for the upward movement of the roller 8' mounted on shaft 9a to be spun. Also, instead of molten glass, the receptacle can be filled with solid glass in the form of fragments or powder, which is then fused in the heated receptacle.

What I claim is:

1. Apparatus for spinning and winding glass filaments, comprising a large number of nozzles disposed substantially in a horizontal circle, said nozzles extending substantially in the direction of the axis of said circle and opening downwardly, means for feeding fluid glass to said nozzles, means for jointly moving the nozzles in a path substantially coinciding with said circle, whereby, through centrifugal action, drops of glass with filaments attached thereto are centrifugally projected outwardly from the nozzles; a collecting ring encompassing the circle of nozzles concentrically, the said nozzles and ring being relatively movable in a path concentric with said circle, said ring extending downwardly from the nozzles for receiving and holding the glass drops projected from the nozzles, a vertically movable winding member disposed axially of the nozzle circle and of the collecting ring and having a diameter smaller than the circle of nozzles, whereby the glass filaments attached to the glass drops, centrifugally projected outwardly from the nozzles, are applied tangentially on the winding member.

2. Apparatus for spinning and winding glass filaments, comprising a large number of nozzles disposed substantially in a horizontal circle, said nozzles extending substantially in the direction of the axis of said circle and opening downwardly, means for feeding fluid glass to said nozzles, said feeding means including a rotatable glass receptacle, the nozzles being arranged at the bottom of said receptacle and connected thereto for receiving glass therefrom, means for jointly moving the nozzles in a path substantially coinciding with said circle, whereby, through centrifugal action, drops of glass with filaments attached thereto are centrifugally projected outwardly from the nozzles; a collecting ring encompassing the circle of nozzles concentrically, the said nozzles and ring being relatively movable in a path concentric with said circle, said ring extending downwardly from the nozzles for receiving and holding the glass drops projected from the nozzles, a vertically movable winding member disposed axially of the nozzle circle and of the collecting ring and having a diameter smaller than the circle of nozzles, whereby the glass filaments attached to the glass drops, centrifugally projected outwardly from the nozzles, are applied tangentially on the winding member.

3. Apparatus according to claim 1, and in which the means for feeding fluid glass to the nozzles includes an annular rotatable glass receptacle, the circle of nozzles being arranged at and connected to the bottom of the glass receptacle, and said winding member passes through the central opening of the annular glass receptacle.

4. Apparatus according to claim 1, and in which the winding member is rotatably mounted, and in which means is provided for rotating the winding member relative to the movement of the nozzles.

5. Apparatus according to claim 1, in which the winding member is of tubular form, and a vertically reciprocal, rotatably journalled mounting member adapted, after the tubular winding member is covered, to serve as a temporary substitute for the latter winding member and receive the filament until the winding member has been replaced by a fresh one, whereby interruption of the spinning operation is avoided.

6. Apparatus for spinning and winding glass filaments upon a winding member to be covered with spun glass filaments, comprising a plurality of superposed spinning units, each comprising an annular receptacle for fluid glass, each receptacle having connected to its bottom a large number of spinning nozzles arranged substantially in a circle, a plurality of collecting rings each encompassing one of said circular arrangements of nozzles concentrically, said rings extending downwardly from their respective nozzles for receiving drops of glass projected therefrom, means for independently rotating each of the receptacles and circular arrangements of nozzles relative to their respective collecting rings, means for moving the winding member to be covered with filaments vertically through the central openings of the annular glass receptacles, said winding member having a smaller diameter than the circular arrangements of nozzles, whereby, when the receptacles and nozzles are rotated, drops of glass to which glass filaments are attached are thrown outwardly from the nozzles to the collecting rings and the glass filaments which stretch from said nozzles to said drops and are applied tangentially on the winding member.

7. Apparatus according to claim 6, and means for rotating each of the collecting rings relatively to the corresponding circles of nozzles.

8. Apparatus according to claim 6, and means for rotating some of the collecting rings relatively to their corresponding circular arrangements of nozzles.

9. Apparatus according to claim 6, and means for rotating some of the collecting rings in the same direction as their corresponding circular arrangements of nozzles but at lower angular speed.

10. Apparatus according to claim 6, and means for rotating some of the collecting rings in the opposite direction from their corresponding circular arrangements of nozzles.

11. Apparatus according to claim 1, and in which the collecting ring has a conical, outwardly curved annular wall which at the lower portion curves inwardly forming an annular groove, and small teeth at the interior of said groove for engaging and holding drops of glass that are received in said groove.

12. Apparatus according to claim 1, and in which the means for feeding glass to the nozzles includes a rotatable glass receptacle, and means for heating said receptacle.

13. Apparatus according to claim 1, and means for heating the nozzles.

14. Apparatus according to claim 1, in which the nozzles are provided with openings about 2-5 mm. in diameter to assure the formation of projecting glass drops.

JOHANNES PINK.